United States Patent
Morris et al.

(10) Patent No.: US 8,490,198 B2
(45) Date of Patent: Jul. 16, 2013

(54) TECHNIQUES FOR LOCAL PERSONALIZATION OF CONTENT

(75) Inventors: Cameron Craig Morris, Saratog Springs, UT (US); Lloyd Leon Burch, Payson, UT (US)

(73) Assignee: Apple Inc., Cupertino, CA (US)

( * ) Notice: Subject to any disclaimer, the term of this patent is extended or adjusted under 35 U.S.C. 154(b) by 1106 days.

(21) Appl. No.: 11/750,791

(22) Filed: May 18, 2007

(65) Prior Publication Data

US 2008/0289013 A1 Nov. 20, 2008

(51) Int. Cl.
*G06F 3/00* (2006.01)
*H04L 9/32* (2006.01)

(52) U.S. Cl.
USPC .......... 726/26; 726/6; 726/30; 713/170; 709/201; 709/203

(58) Field of Classification Search
USPC .......... 726/2–6, 26–30; 713/155, 168, 170; 709/201–203
See application file for complete search history.

(56) References Cited

U.S. PATENT DOCUMENTS

| | | | |
|---|---|---|---|
| 7,130,616 B2 | 10/2006 | Janik | |
| 7,143,025 B2 * | 11/2006 | Walsh et al. | 703/21 |
| 7,346,649 B1 * | 3/2008 | Wong | 709/203 |
| 2002/0091725 A1 | 7/2002 | Skok | |
| 2002/0129063 A1 | 9/2002 | Kosak et al. | |
| 2003/0061386 A1 * | 3/2003 | Brown et al. | 709/246 |
| 2003/0088831 A1 * | 5/2003 | Bauer et al. | 715/516 |
| 2003/0182357 A1 | 9/2003 | Chess et al. | |
| 2003/0200316 A1 | 10/2003 | Isozaki et al. | |
| 2003/0229900 A1 * | 12/2003 | Reisman | 725/87 |
| 2004/0015725 A1 | 1/2004 | Boneh et al. | |
| 2004/0103295 A1 * | 5/2004 | Gustafsson | 713/200 |
| 2004/0221006 A1 * | 11/2004 | Gopalan et al. | 709/203 |
| 2004/0253945 A1 | 12/2004 | Janik | |
| 2006/0047661 A1 * | 3/2006 | Chowdhury et al. | 707/10 |
| 2006/0259544 A1 | 11/2006 | Zubenko et al. | |
| 2007/0204004 A1 * | 8/2007 | Coyer et al. | 709/217 |
| 2007/0208751 A1 * | 9/2007 | Cowan et al. | 707/10 |
| 2008/0228911 A1 * | 9/2008 | Mackey | 709/224 |

* cited by examiner

*Primary Examiner* — Andrew L Nalvern
*Assistant Examiner* — Amir Mehrmanesh
(74) *Attorney, Agent, or Firm* — Blakely, Sokoloff, Taylor & Zafman LLP (57) ABSTRACT

Techniques for the local personalization of content are presented. A content personalization service is dynamically pushed from a server environment to a client processing environment associated with a principal on demand. The content personalization service interjects itself between content that the principal attempts to view and access within the client processing environment and modifies and personalizes that content on behalf of the principal before the principal can view or access the content.

28 Claims, 3 Drawing Sheets

TECHNIQUES FOR LOCAL PERSONALIZATION OF CONTENT

FIELD

The invention relates generally to data processing and more particularly to techniques for local personalization of content.

BACKGROUND

Increasingly, enterprises and end-users have a need to access data from a variety of locations using a variety of devices. The physical location of the data and the users has become irrelevant in today's highly connected environment and with the advent and pervasiveness of the World-Wide Web (WWW). The challenge for content providers has now become how that data can be customized for particular devices and particular users.

Conventionally, user content customization occurs via applets installed and embedded within a World-Wide Web (WWW) browser of the user. These applets are typically tied to a particular WWW browser, a particular device, and a particular processing environment associated with the user. The applets are also manually installed once within the browser and unless updated manually by a user, remain constant even though circumstances and preferences of the user are chaotic and dynamic in fashion.

Consequently, when the user switches browsers, devices, or even alters or changes processing environments, the applets often become inoperable. This is inconvenient for a user that may access a variety of different browsers, devices, and may use a variety of different processing environments to access the Internet.

As a result, a user may attempt to independently manage a variety of different applets for the different devices and browsers that the user may want to access. This can become a daunting management task for the user and may frustrate the user when some customization is available in one context and not available in another context.

Thus, present solutions are not portable and reusable in an automated fashion; accordingly, the user cannot divorce him or her self from managing different context situations for which the user may access the Internet. In fact, many users have given up trying to manage this situation and have resigned themselves to accepting a loss of functionality for some contexts.

Thus, what is needed is a mechanism, which allows for improved localized personalization of content.

SUMMARY

In various embodiments, techniques for local personalization of content are provided. More specifically, and in an embodiment, a method is presented for local personalization of content delivered to a client of a principal on demand. A principal, who is requesting access to a content personalization service, is authenticated for access. Next, the content personalization service is acquired when the principal is authenticated and in response to an identity associated with the authenticated principal. The content personalization service is dynamically delivering, over a network connection, to a local processing environment associated with the principal. The content personalization service, when processed in the local processing environment of the principal, modifies and personalizes content delivered over the network connection to the principal.

DETAILED DESCRIPTION

A "resource" includes a user, content, a processing device, a node, a service, an application, a system, a principal, a directory, a data store, groups of users, combinations of these things, etc. A "principal" is a type of resource that engages in a communication session with one or more other resources for purposes of gaining access to those resources, such as acquiring access to content. The resources that the principal seeks to access may also have their own and sub resources. In an embodiment, a "principal" may be viewed as a user or as an automated application or service. The terms "service" and "application" may be used interchangeably herein and refer to a type of software resource that includes instructions, which when executed by a machine performs operations that change the state of the machine and that may produce output to drive the processing of other machines or resources.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given communication session, etc.).

An identity for a principal is at least partially resolved via an authentication technique in which the principal supplies or is identified by a single identifier and one or more authentication secrets (e.g., passwords, biometric data, digital signatures, digital certificates, etc.).

An "identifier" may be viewed as a principal name or principal ID that the principal may assume for any given context. In an embodiment, a principal has a single identifier and multiple authentication secrets that can be used with that single identifier. In another embodiment, the principal has multiple identifiers, and any given identifier can be used with each of the principal's available authentication secrets.

The principal's identity for any given context is resolved by authentication techniques that engage an identity service. The identity service uses a single supplied identifier and one or more of multiple available authentication secrets to resolve a particular identity for the principal in a given context.

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

An "identity service" refers to a special type of service that is designed to manage and supply authentication services and authentication information for resources. So, an identity service may authenticate a given principal for access to a variety of local and external resources known to that identity service. In addition the identity service itself may be viewed as a type of resource. In this manner, identity service may authenticate and establish trust with one another viewing one another as specific type of resource. An identity service may also enlist the assistance of other resources or services to perform any given authentication on a principal.

According to an embodiment, some example identity services, which may be used with the teachings presented herein, are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are all incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

For any particular resolved identity, a variety of other attributes may be assigned by the identity service or other services or resources that the identity service uses. That is, when the principal desires access to a resource or engages in a communication session with that resource, the access or session may require or may beneficially utilize other information beyond just the identity associated with the principal. Some example attributes or attribute types may include, by way of example only and not by way of limitation, a role that may define access rights and permissions, an employee number, an address, a phone number, a credit card number, income, social security number, etc.

"Content" refers to information, such as text, audio, graphics, video, scripts, programs, images, etc. that is requested and desired by a principal over a network connection, such as the Internet. In an embodiment, content represents a World-Wide Web (WWW) page provided by a WWW site via a content distributor or provider. The content may include primary data such as the text, audio, etc. and may also include presentation details embodied in secondary or metadata about the primary data, such as bolding, page placement, effects, fonts, etc.

As used herein a "client" refers to one or more machines or services operating within a local processing environment or client processing environment. A "server" refers to one or more machines or services operating within a remote or server processing environment. The client and server communicate with one another over a network connection, such as a wide-area network (WAN) (e.g., Internet, etc.) of a local area network (LAN) such as within a firewall environment. This represents a client-server architecture, in which machines and environments communicate with one another over a network from different environments and/or machines.

Various embodiments of this invention can be implemented in existing network architectures, security systems, data centers, and/or communication devices. For example, in some embodiments, the techniques presented herein are implemented in whole or in part in the Novell® proxy server products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
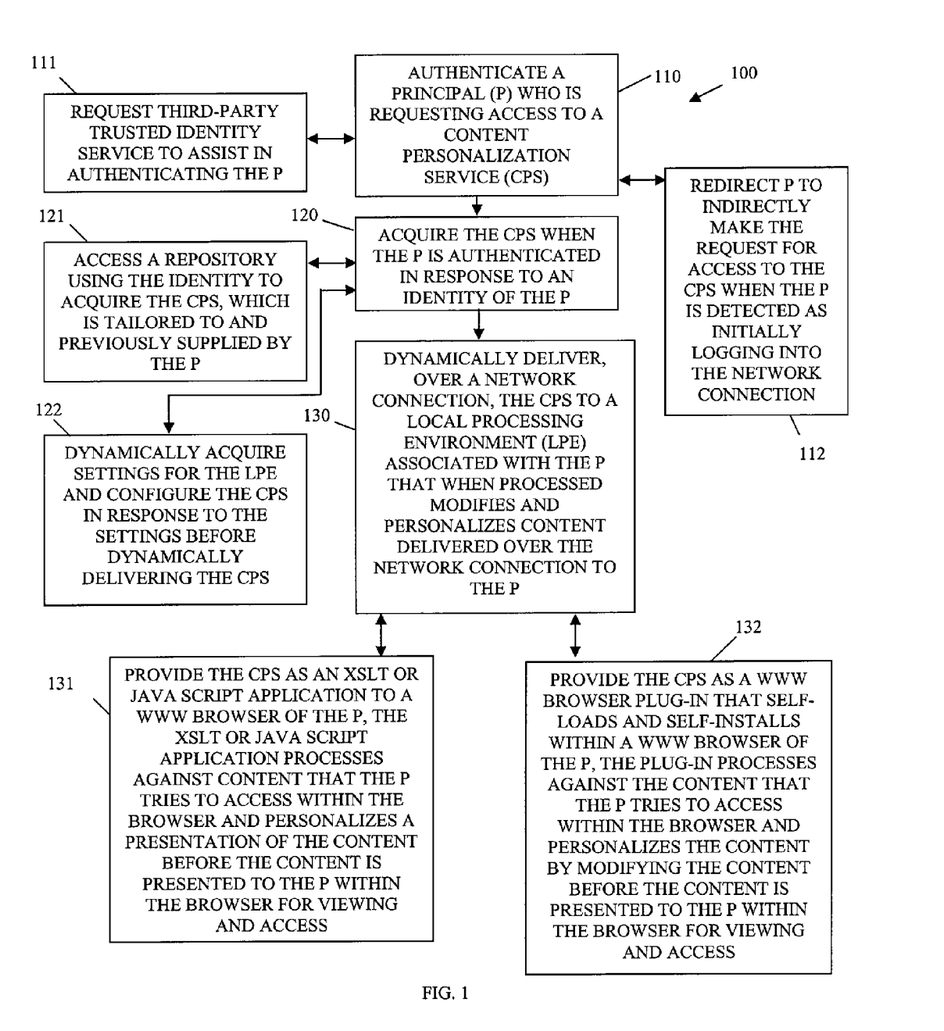
FIG. 1 is a diagram of a method for local personalization of content delivered to a client of a principal on demand, according to an example embodiment.

FIG. 1 is a diagram of a method 100 for local personalization of content delivered to a client of a principal on demand, according to an example embodiment. The method 100 (hereinafter "server service") is implemented as instructions in a machine-accessible and readable medium. The instructions when executed by a machine perform the processing depicted in FIG. 1. The server service is also operational over and processes within a network. The network may be wired, wireless, or a combination of wired and wireless.

The server service acts a central and portable repository for content personalization services that are administered to client processing environments over a network connection, such as the Internet. These content personalization services are pushed to the client processing environments and dynamically processed to modify and personalize content that principals attempt to access over the network connection. The server service may also interact with multiple instances of client services, which are described below with reference to FIG. 2.

At 110, the server service authenticates a principal who is requesting access to a content personalization service (CPS). A CPS is an executable or schema definition for subsequent execution by another service that is customized for the principal. As will be demonstrated below, the CPS when executed within the local or client processing environment of the principal interjects itself between content presentation to the principal in order to modify and personalize the content for viewing and access by the principal. The personalization may relate to changing or augmenting the content and/or it may relate to altering a display presentation for the content.

According to an embodiment, at 111, the server service requests a third-party trusted identity service to assist in or facilitate authenticating the principal. Example identity services were discussed and incorporated by reference above.

In some cases, at 112, the server service may initially receive the request for the CPS via a redirection of the principal, such as through WWW browser interactions, such that the principal indirectly makes the request for access to the CPS. This redirection is done when the principal is detected as initially attempting to log into the network connection.

At 120, the server service acquires the CPS when the principal is authenticated for access. One way to do this, at 121, is for the server service to access a repository having a plurality of CPS's using the identity of the principal as a search term to return the specific CPS associated with and tailored to the principal.

It may also be that the principal previously supplied the CPS to the repository. In this manner, the principal may supply his or her personalized CPS implementations or definitions for the server service to manage and distribute on demand when requested by the principal. This provides centralized and platform independent access to the CPS for the principal regardless of device or processing environment being used by the principal.

In some cases, at 122, the server service may also dynamically acquire settings for the local processing environment of the principal that is identified when the principal is authenticated for access. These settings may include environment configuration information that the server service uses to dynamically configure the CPS before the CPS is delivered or pushed to the local processing environment of the principal.

So, the CPS may be generic in nature and the server service may instantiate it and configure it for a given set of settings associated with the local processing environment of the principal as it appears when the principal is authenticated for access to the CPS. It may also be the case that the principal is associated with a plurality of CPS's and the settings assist the server service in selecting an optimal or most appropriate CPS for delivery to the local processing environment of the principal.

At 130, the server service dynamically and in real time delivers or pushes, over a network connection, the CPS to the local processing environment of the principal. The CPS when processed within the local processing environment of the principal modifies and personalizes content that is subsequently delivered over the network connection to the principal.

In an embodiment, at 131, the server service may provide the CPS as an extensible style sheet language (XSL) transformation (XSLT) application to a WWW browser of the principal within the local or client processing environment of the principal. The XSLT application when processed against content that the principal attempts to view or access within the browser personalization a presentation of that content before the principal can view or access the content. At 131, the service may also provide the CPS as a JAVA script; rather than an XSLT application.

In another embodiment, at 132, the server service may provide the CPS as a WWW browser plug-in that self-loads, self-installs, and self-executes within a WWW browser of the principal within the local or client processing environment of the principal. The WWW browser plug-in, when processed against content within the WWW browser that the principal attempts to access or view, personalizes the content by modifying the content before the principal can view or access the content.

Figure 2:
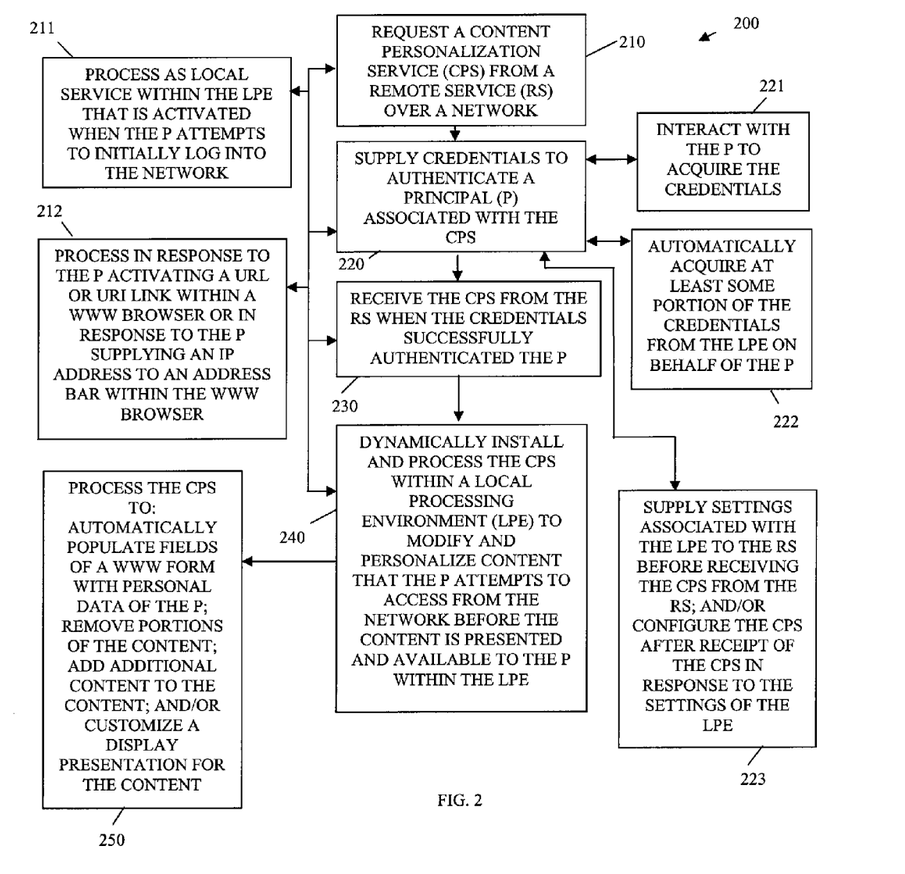
FIG. 2 is a diagram of another method for local personalization of content delivered to a client of a principal on demand, according to an example embodiment.

FIG. 2 is a diagram of another method 200 for local personalization of content delivered to a client of a principal on demand, according to an example embodiment. The method 200 (hereinafter "client service" is implemented in a machine-accessible and readable medium as instructions. The instructions when executed by a machine perform the processing depicted in the FIG. 2. Moreover, the client service is operational over a network, and the network may be wired, wireless, or a combination of wired and wireless.

The processing associated with the client service cooperates and interacts with the server service described above with the method 100 and within the context of the FIG. 1. The client service facilitates the dynamically installation of content personalization services within a client processing environment of a principal for purposes of dynamically modifying and personalizing content accessed by the principal.

It is noted that the client service is optional as interaction with the server service may be achieved via an Application Programming Interface (API) or form driven fields of WWW pages between the server service and a requesting principal. However, in some cases, the client service may be beneficial and installed as a local service within the principal's client processing environment or even as a plug-in within the principal's WWW browser. Additionally, the client service may be acquired, installed, and executed in a dynamic fashion from the client processing environment over a network connection.

At 210, the client service requests a content personalization service (CPS) from a remote service over a network. In some cases, the remote service is the server service described in detail above with reference to the method 100 of the FIG. 1.

According to an embodiment, at 211, the processing of the client service may be installed and executed as a local service within the local or client processing environment. The client service is activated or invoked automatically when the principal attempts to log into the network.

In a different arrangement, at 212, the processing of the client service may be invoked and executed in response to the principal activating a uniform resource locator (URL) or identifier (URI) link within a WWW browser or invoked and executed in response to the principal supplying a particular IP address to an address bar within the WWW browser. The IP address may be associated with the remote service.

At 220, the client service supplies credentials to authenticate the principal to the remote service. The credentials permit the principal to be authenticated to receive access to and delivery of the CPS from the remote service.

In an embodiment, at 221, the client service may iteratively interact with the principal to acquire some or all of the credentials. In another situation, at 222, the client service may automatically acquire at least some of the credentials from the local processing environment on behalf of the principal. For instance, some credential information may be acquired from a browser cookie on behalf of the principal.

It may also be the case, at 223 that the client service automatically interacts with the remote service to dynamically supply settings associated with the local processing environment of the principal before the CPS is actually received from the remote service. As was discussed above with reference to the method 100 of the FIG. 1, the remote service may use this information to dynamically configure the CPS for processing within the local processing environment of the principal. In other cases, the settings may be retained by the client service and then used by the client service to configure the received CPS for processing within the local processing environment of the principal. So, the settings may be supplied to the remote service for configuration of the CPS or the client service may independently use the settings to self configure the CPS once received from the remote service over the network.

At 230, the client service receives the CPS from the remote service over the network when the credentials are successful in authenticating the principal to the remote service for access to and delivery of the CPS. Any CPS configuration necessary for the local processing environment of the principal may be achieved in a manner discussed at 223, above.

Once the CPS is received and optionally configured, at 240, the client service dynamically installs and processes the CPS within the local processing environment of the principal to modify and personalize content that the principal attempts to access and view from the network and before the content is made available to the principal within the local processing environment. Essentially, the CPS interjects itself between content presentation provided to the principal to achieve content modification and personalization.

In an embodiment, at 250, the client service processes the CPS to automatically populate fields of a WWW form (requested content of the principal) with personal data of the principal. So, the CPS may be used to provide partial or complete form fill. In addition, the CPS may be used to remove portions of content requested by a principal, such as advertisements, sensitive data not intended for the principal, video content destined for a device that will not support it or even a bandwidth connection to the network that will not support it, etc. Likewise, the CPS may be used to add or augment the content with additional content or information, such as sensitive comments or advertisements, etc. Furthermore, the CPS may be used to customize a display presentation for the content to the liking of the principal or to the liking of a particular content provider or distributor.

Figure 3:
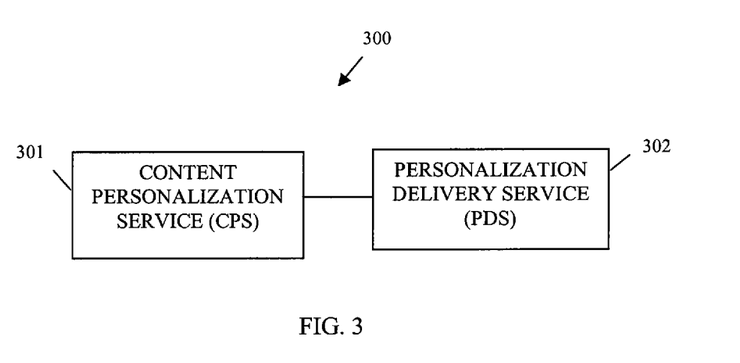
FIG. 3 is a diagram of a local content personalization system, according to an example embodiment.

FIG. 3 is a diagram of a local content personalization system 300, according to an example embodiment. The local content personalization system 300 is implemented as instructions on or within a machine-accessible and readable medium. The instructions when executed by a machine perform processing depicted with respect to the method 100 of the FIG. 1. The local content personalization system 300 is also operational over a network and the network may be wired, wireless, or a combination of wired and wireless. In some cases the network is the Internet or a wide-area network (WAN).

The local content personalization system 300 includes a content personalization service 301 and a personalization delivery service 302. Each of these will now be discussed in turn.

The content personalization service (CPS) 301 is implemented in a machine-accessible and readable medium and is to process on a client machine of a client processing environment that is associated with a principal. The CPS 301 was described in detail above with reference to the methods 100 and 200 of the FIGS. 1 and 2.

The CPS 301 once acquired, installed, and executed (described herein below and above) within the client processing environment and on the client machine of a requesting principal intercepts, modifies, and personalizes content on the client machine before the principal accesses and views the content.

According to an embodiment, the CPS 301 is processed as a WWW browser plug-in that executes within a WWW browser on of the client machine. The CPS 301 may also be independent of any particular browser and may be delivered as machine code as a service that can process on or be dynamically configured to process on a variety of different client machines and within a variety of different client processing environments.

The CPS 301 can be initially received from or defined by the principal within an environment of the personalization delivery service (PDS) 302 during a prior interaction and before the principal requests the CPS 301 from the PDS 302.

The PDS 302 is implemented in a machine-accessible and readable medium and is to process on a server machine that is remote over a network connection from the client machine that as is demonstrated below ultimately processes the content personalization service 301 on behalf of a principal. Example processing associated with the personalization delivery service 302 was presented in detail above with reference to the server service represented by the method 100 of the FIG. 1

The PDS 302 is processed to dynamically deliver for installation and processing to the client machine the CPS 301 for the principal when the principal is properly authenticated to the PDS 302. The PDS 302 resolves the specific CPS 301 in response to the identity of the principal when the principal is authenticated to the PDS 302. The CPS 301 is then dynamically delivered to the client machine for dynamic installation and processing.

In an embodiment, the PDS 302 is to also acquire settings associated with the client machine and the client processing environment and is to configure and customize the CPS 301 for those settings before dynamic delivery to the client machine.

According to another embodiment, the PDS 302 dynamically pushes the CPS 301 to the client machine when the principal logs into the network connection or when the principal logs into the PDS 302. In this manner, the principal acquires the CPS 301 from whatever environment and device that the principal may use to log into the network or the PDS 302. The CPS 301 can be customized and tailored to the particular device of environment of the principal and dynamically pushed and installed there for processing.

In another case, the PDS 302 dynamically updates and modifies the CPS 301, which has already been delivered to the client machine, in response to a dynamic policy evaluation or in response to a dynamically received instruction. The updated CPS 301 or modifications that are to be dynamically applied to the CPS 301 are dynamically updated on the client machine. In this manner, the operation of the CPS 301 can be dynamically altered and updated by the PDS 302.

Figure 4:
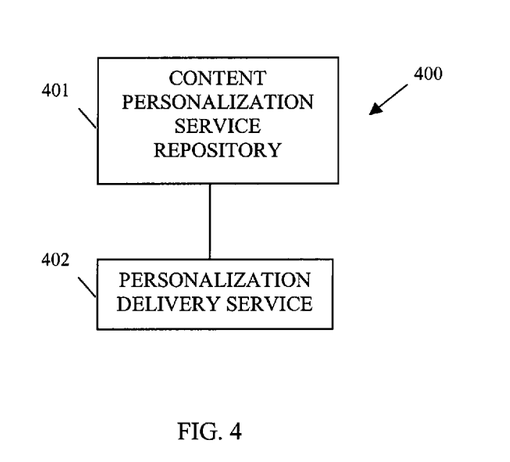
FIG. 4 is a diagram of another local content personalization system, according to an example embodiment.

FIG. 4 is a diagram of another local content personalization system 400, according to an example embodiment. The local content personalization system 400 is implemented as instructions on or within a machine-accessible and readable medium. The instructions when executed by one or more machines also perform, among other things; the processing depicted with respect to the method 100 of the FIG. 1. The local content personalization system 400 is also operational over a network and the network may be wired, wireless, or a combination of wired and wireless.

The local content personalization system 400 includes a content personalization service repository 401 (hereinafter repository 401) and a personalization delivery service (PDS) 402. Each of these will now be discussed in turn.

The repository 401 is implemented in machine-accessible and readable medium and is accessible to or on a server machine within a server processing environment.

The repository 401 supplies and houses a plurality of content personalization services (CPS's). The CPS ultimately process within the client processing environments to modify and personalize content before that content is viewed and accessed by principals. Each CPS within the repository 401 may be acquired by an identity associated with a particular principal and/or via policy evaluation.

In an embodiment, at least one of the CPS's are initially supplied to or defined within the repository 401 by some of the principals. So, some CPS's may be actively managed and supplied by the principals for whom the CPS's customize and personalize content. Policy may also drive whether principals are permitted to supply their own CPS's. Additionally, some CPS's may be defined and supplied within the repository 401 by an administrator on behalf of some of the principals. Furthermore, a single principal may have multiple CPS's, where some are provided by the principal to the repository 401 and where others are supplied by an administrator on behalf of the principal to the repository 401.

The PDS 402 is implemented in a machine-accessible and readable medium and is to process on the server machine or a different machine accessible within the server processing environment over a network connection, such as an Internet connection. Example processing associated with the personalization delivery service 402 has been described in detail above with reference to the FIGS. 1 and 3.

The PDS 402 is processed to manage a plurality of CPS's housed in the repository 401 on behalf of a plurality of principals. The PDS 402 also dynamically pushes the CPS's to the principals on demand, such as when the principals are detected as logging into the PDS 402 or a network, or such as when the principals specifically request CPS's from the PDS 402.

Again, detailed processing associated with the PDS 402 was supplied above with reference to the FIGS. 1-3.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine readable non-transitory storage medium storing executable instructions which when executed by a data processing system cause the system to perform a method, comprising:
   authenticating, by a central server, a principal who is requesting access to a content personalization service;
   acquiring, by the central server, the content personalization service, wherein the content personalization service is configured for a given set of settings for a local processing environment of the principal wherein the content personalization service configuration is selected based on said given set of settings;
   dynamically instantiating, by the central server, the content personalization service, wherein the content personalization service instance is configured to process in the local processing environment;
   dynamically generating, by the central server, an executable of the content personalization service; and
   dynamically delivering, by the central server, the executable of the content personalization service over a network connection to the local processing environment;
   wherein the content personalization service is dynamically installed and processed in the local processing environment, wherein the content personalization service modifies and personalizes content delivered to the principal over the network connection by interjecting itself between the content presented to the principal and the content received over the network connection.

2. The medium of claim 1, wherein authenticating further includes requesting a third-party trusted identity service to assist in authenticating the principal.

3. The medium of claim 1, wherein acquiring further includes accessing a repository using identity associated with the principal to acquire a configuration of the content personalization service tailored to the principal, the configuration previously supplied by the principal.

4. The medium of claim 1, wherein dynamically delivering further includes providing the content personalization service as an extensible style sheet transformation (XSLT) application or JAVA script application to a World-Wide Web (WWW) browser of the principal, wherein the XSLT or JAVA script application processes against the content that the principal attempts to access within the WWW browser and personalizes a presentation of the content before the content is presented to the principal within the WWW browser for viewing and access.

5. The medium of claim 1, wherein dynamically delivering further includes providing the content personalization service as a World-Wide Web (WWW) browser plug-in that self-loads and self-installs within a WWW browser of the principal, and wherein the WWW browser plug-in processes against the content that the principal attempts to access within the WWW browser and personalizes the content by modifying the content before the content is presented to the principal within the WWW browser for viewing and access.

6. The medium of claim 1, the method further comprising:
   dynamically acquiring the settings associated with the local processing environment; and
   configuring the content personalization service in response to the settings before dynamically delivering the content personalization service to the local processing environment of the principal.

7. The medium of claim 1, the method further comprising, redirecting the principal to indirectly make the request for access to the content personalization service when the principal is detected as initially logging into the network connection.

8. The medium of claim 1, wherein the content personalization service is previously supplied by the principal to the central server as an implementation or definition.

9. A machine readable non-transitory storage medium storing executable instructions which when executed by a data processing system cause the system to perform a method, comprising:
   requesting access to a content personalization service by a principal from a remote service residing on a central server;
   supplying credentials to authenticate the principal associated with the content personalization service;
   receiving the content personalization service as an executable from the remote service after the credentials successfully authenticate the principal, wherein the content personalization service is dynamically instantiated and generated by the central server, wherein the content personalization service instance is configured to process in the local processing environment, and the content personalization service is configured for a given set of settings for a local processing environment of the principal, wherein the content personalization service configuration is selected based on said given set of settings;
   dynamically installing the content personalization service within the local processing environment of the principal; and
   dynamically possessing the content personalization service in the local processing environment of the principal;
   wherein the content personalization service modifies and personalizes content delivered to the principal over the network connection by interjecting itself between the content presented to the principal and the content received over the network connection.

10. The medium of claim 9, the method further comprising, processing the method as a local service within the local processing environment that is activated when the principal attempts to initially log into the network.

11. The medium of claim 9, the method further comprising, processing the method in response to the principal activating a uniform resource locator (URL) or identifier (URI) link within a World-Wide Web (WWW) browser or supplying an Internet Protocol (IP) address to an address bar within the WWW browser.

12. The medium of claim 9, the method further comprising, processing the content personalization service to do one or more of the following within a World-Wide Web (WWW) browser of the principal:
- automatically populating selective fields of a WWW form with personal data of the principal;
- removing portions of the content before presenting within the WWW browser;
- adding additional content before presenting within the WWW browser; and
- customizing a display presentation before presenting the content within the WWW browser.

13. The medium of claim 9, wherein supplying further includes interacting with the principal to acquire the credentials.

14. The medium of claim 9, wherein supplying further includes automatically acquiring at least some portion of the credentials from the local processing environment on behalf of the principal.

15. The medium of claim 9, the method further comprising one or more of the following:
- supplying the settings associated with the local processing environment to the remote service before receiving the content personalization service from the remote service; and
- configuring the content personalization service after receipt of the content personalization service in response to the settings of the local processing environment.

16. The medium of claim 9, wherein the content personalization service is previously supplied by the principal to the central server as an implementation or definition.

17. A system, comprising:
- a content personalization service implemented for a client machine and processed in a client processing environment associated with the client machine of a principal; and
- a personalization delivery service implemented and processed on a server machine or a different machine accessible to the server machine, wherein the server machine or the different machine can connect to the client machine remotely over a network connection, and wherein the personalization delivery service dynamically delivers the content personalization service to the client machine when the principal is successfully authenticated by the server machine;
- wherein the content personalization service is configured for a given set of settings for the client processing environment, wherein the content personalization service is selected based on said given set of settings, and wherein the content personalization service is dynamically instantiated and dynamically generated as an executable by the server machine prior to being dynamically delivered by the personalization delivery service, as an executable, to the client machine, wherein the content personalization service instance is configured to process in the client processing environment, and the content personalization service is dynamically installed and processed in the client processing environment, and the content personalization service modifies and personalizes content delivered to the principal over the network connection by interjecting itself between the content presented to the principal and the content received over the network connection.

18. The system of claim 17, wherein the content personalization service is to be processed as a World-Wide Web (WWW) browser plug-in that processes within a WWW browser of the client machine.

19. The system of claim 17, wherein a configuration of the content personalization service is initially received from or defined by the principal and before the principal requests the content personalization service from the personalization delivery service.

20. The system of claim 17, wherein the personalization delivery service is to dynamically update and modify the content personalization service in response to dynamic policy evaluation or dynamically received instruction and is to push the update to the client machine.

21. The system of claim 17, wherein the personalization delivery service is to dynamically push the content personalization service to the client machine when the principal logs into the network connection or when the principal logs into the personalization delivery service.

22. The system of claim 17, wherein the principal previously supplied the content personalization service as an implementation or definition to the personalization delivery service in a different transaction with the personalization delivery service.

23. A system, comprising:
- content personalization service repository implemented in a machine-accessible medium and accessible to a server machine within a server processing environment, wherein the content personalization service repository includes at least one content personalization service; and
- a personalization deliver service implemented and processed on a server machine or a different machine accessible within the server processing environment, wherein the personalization delivery service manages the at least one content personalization service located in the content personalization service repository;
- wherein the personalization delivery service can dynamically push the at least one content personalization service as an executable to at least one client processing environment associated with at least one principal, over a network connection, by selecting the at least one content personalization service based on the at least one principal and particular settings for the at least one client processing environment of the at least one principal, after the at least one principal is successfully authenticated by the server machine, and
- wherein the at least one content personalization service is configured for a given set of settings for the at least one client processing environment of at least one client machine, wherein the at least one content personalization service is selected based on said given set of settings, and wherein the at least one content personalization service is dynamically instantiated and dynamically generated as an executable by the server machine prior to being dynamically delivered by the personalization delivery service, as an executable, to the at least one client machine, wherein the at least one content personalization service instance is configured to process in the at least one client processing environment, and the at least one content personalization service is dynamically installed and processed in the at least one client processing environment, and the at least one content personalization service modifies and personalizes content delivered to the at least one principal over the network connection by interjecting itself between the content presented to the at least one principal and the content received over the network connection.

24. The system of claim 23, wherein the at least one content personalization service configuration is initially defined by the at least one principal.

25. The system of claim 23, wherein the at least one content personalization service configuration is initially defined by an administrator on behalf of the at least one principal.

26. The system of claim 23, wherein the at least one content personalization service is a World-Wide Web (WWW) browser plug-in that is delivered to at least one WWW browser for dynamic loading and processing within the at least one client processing environment.

27. The system of claim 23, wherein the personalization delivery service is automatically invoked for processing by one or more of the following: specific requests received from the at least one principal, a login attempt made by the at least one principal to access the network connection, and login attempts made by the at least one principal to access the personalization delivery service.

28. The system of claim 23, wherein the at least one principal supplies the at least one content personalization service as an implementation or definition to the personalization delivery service for on demand delivery to the at least one principal when requested by the at least one principal in a different transaction with the personalization delivery service.

* * * * *